United States Patent [19]

Liu

[11] Patent Number: 4,818,180
[45] Date of Patent: Apr. 4, 1989

[54] VERTICAL-AXLE WIND TURBINE

[76] Inventor: Hsun-Fa Liu, c/o Victoria Li, 1749 Shadowview Dr., Austin, Tex. 78758

[21] Appl. No.: 167,477

[22] Filed: Feb. 29, 1988

[51] Int. Cl.$^4$ .............................................. F03D 7/06
[52] U.S. Cl. ..................................... 416/117; 416/139
[58] Field of Search ................ 416/117 R, 117 B, 87, 416/88, 139 A

[56] References Cited

U.S. PATENT DOCUMENTS

| | | | |
|---|---|---|---|
| 465,681 | 12/1891 | Smith | 416/139 A X |
| 584,986 | 6/1897 | Chapman | 416/139 A X |
| 631,982 | 8/1899 | Bruce | 416/139 A X |
| 802,791 | 10/1905 | Abbey | 416/117 X |
| 1,198,410 | 9/1916 | Bjornson | 416/117 X |
| 1,352,952 | 9/1920 | Gracey | 416/139 A X |
| 1,364,681 | 1/1921 | Barto | 416/117 |
| 1,581,537 | 4/1926 | Hennigh | 416/117 |
| 1,707,507 | 4/1929 | Burch | 416/117 |
| 4,365,935 | 12/1982 | Zukeran | 416/117 |
| 4,649,284 | 3/1987 | Hsech-Pen | 416/117 X |

FOREIGN PATENT DOCUMENTS

144591 2/1936 Austria ........................... 416/117 B

*Primary Examiner*—Everette A. Powell, Jr.

[57] ABSTRACT

An apparatus relating to a vertical-axle wind turbine comprises fore eccentric compressible and tensible slide-cantilevers, rear eccentric tensible ropes, dual-rocker trapezoid linkages, slightly inclined flap-blades, and counter-lever with equipoises. Accordingly, all blades on the wind turbine can catch favorable wind force at optimum leeway about 260 degrees each rotation; can absorb centrifugal, centripetal and circumferential shocks from gusts and variable wind force and convert the same to the same direction of torque; can adjust their radius against variable wind speed to stabalize the rotary speed; and can release resistance from relative wind sensitively and streamlined within the remaining 100 degrees of the rotation under the control of respective dual-rocker trapezoid linkages and equipoises to drive the apparatus for converting wind force to mechanical power most efficiently for commitment.

1 Claim, 7 Drawing Sheets

VERTICAL-AXLE WIND TURBINE

B. CROSS-REFERENCES TO RELATED APPLICATIONS

1. Previous U.S. applications Serial No. 919,041 (06-26-78) and 025,384 (3-13-87) abandoned.
2. Canadian application Serial No. 552,492-1 (3-19-87) the same content as U.S. application No. 025,384.

C. BRIEF SUMMARY OF THE INVENTION:

This invention relates to apparatus for converting wind force to mechanical power, commonly classified as a wind turbine. Accordingly, this invention provides apparatus, which comprises a vertical axle, upper and lower horizontally disposed wheels, pairs of fore eccentric compressible and tensible radial slide-cantilevers inserted into fore eccentric tube spokes on the upper and lower wheels about the axle, pairs of rear eccentric tensible ropes to be connected between rear eccentric stakes and respective fore eccentric radial slide-cantilivers, pairs of dual-rocker trapezoid linkages each chained between the fore eccentric slide-cantilevers and the upper and lower beams of the upstanding frame to define deflection of the upstanding frame toward both sides of the dual-rockers about 40 degrees from respective upper and lower fore eccentric slide-cantilevers, a plurality of flap-blades each with the axis on its upper edge hinged slightly inclined across the upstanding frame, and a plurality of equipoises each of which containing a rolling ball in a reverse-arch tube on a crank counter-lever or just containing a counter-arm at the end of a counter-lever extends reversely from the upper side of respective flap-blades.

Referring to aforesaid apparatus of this invention, in which: All blades on the apparatus can catch favorable wind force at optimum leeway about 260 degrees each rotation about the vertical axle and release resistance from relative wind sensitively and streamlined within the remaining 100 degrees of the rotation by help of respective dual-rocker trapezoid linkages and equipoises; all fore ecentic compressible and tensible slide-cantilevers and rear eccentric tensible ropes can convert centripetal, centrifugal and circumferential component wind forces on the blades to the same direction of torque and act as shock buffers and speed stabilizers against gusts and variable wind speed; the upper and lower wheels can act as flywheels to stabilize the rotary speed, and the lower wheel can also act as an accelerator and driving wheel to convert the torque to mechanical power most efficiently for commitment.

1 - Vertical axle
2, 2' - Upper and lower wheels
3, 3' - Bearings for upper and lower wheels
4, 4' - Driven wheels
5, 5' - Upper and lower fore-eccentric tube-spokes
6, 6' - Upper and lower fore eccentric blocks
7, 7' - Upper and lower fore eccentric slide-cantilevers
8, 8' - compression springs
9, 9' - Upper and lower rear eccentric ropes
10, 10' - Tension springs
11, 11' - Upper and lower rear-eccentric stakes
12, 12' - Hooks at the upper and lower fore eccentric slide-cantilevers to connect to rear eccentric ropes
13 - Tightening screw to fasten and adjust the length of counter-lever 26 or 31
14, 14', 15, 15' - Bearings on the upper and lower slidecantilevers to support the root ends of dual-rockers 16, 16' , 17, 17'
16, 16', 17, 17' - Pair of upper and lower dual-rockers
18, 18' - Top levers of the upper and lower trapezoid linkages as well as the upper and lower beams of the upstanding frame
19 - Upstanding frame
20, 20', 21, 21' - Bearings to support the extremities of upper and lower dual-rockers 16, 16', 17, 17'
22, 22' - Bearings of flap-blade 24
23, 23' - Axes of flap-blade 24
24, 24' - Upper and lower flap-blades
25 - Tube rib of blade 24
26 - Crank counter-lever at obtuse angle
27 - Tube clip
28 - Reverse-arch tube
29 - Rolling ball as equipoise
39, 30' - Covers at both ends of the reverse-arch tube
31 - Counter-lever
32 - Counter-arm as equipoise
33, 33' - Auxiliary equipoises
34 - Screw to adjust and tighten the contained angle between the counter-lever and the counter-arm

E. DETAILED DESCRIPTION

This invention relates to the apparatus for converting wind force to mechanical power, which apparatus is commonly classed as a wind turbine and has in view an important objective to secure maximum favorable wind force with least resistance against headwind while blades are feathering about the vertical axle.

Accordingly, the apparatus of this invention, as a wind turbine, comprises a vertical axle, upper and lower horizontally disposed wheels, pairs of compressible and tensible slide-cantilevers inserted into fore eccentric tube spokes on the upper and lower wheels about the axle, pairs of ropes strung with tension springs connected between the rear eccentric stakes and respective slide-cantilevers, pairs of dual-rocker trapezoid linkages each chained between the upper and the lower slide-cantilevers and the upper and the lower beams of the upstanding frame to define deflection of the upstanding frame toward both sides upon the dual-rockers about 40 degrees from respective upper and lower fore eccentric slide-cantilevers, a plurality of flap-blades each with the axis on its upper edge hinged slightly inclined across the upstanding frame, and a plurality of equipoises each of which containing a rolling ball in a reverse-arch tube on a crank counter-lever or just containing a counter-arm at a counter-lever extends reversely from the upper side of respective flap-blades.

Referring to the flap-blades of this invention, each of which can catch favorable wind force while leaning against the upstanding frame behind and on the other hand can stretch its tail horizontally to release relative wind force in the manner substantially streamlined with least resistance against relative wind force. When it stretches horizontally to release relative wind force, it can also sense favorable wind force from its outer side by its inclined plane, which then enables itself to detect and respond instantly to the incoming favorable wind force as soon as it reaches the alternate boundary from the headwind range to the favorable wind range without waiting until it goes deeper into the favorable wind range or returns further toward the center of its oscillating quadrant to catch the favorable wind force from its tail.

Referring to the pairs of dual-rocker trapezoid linkages of this invention, each pair of which can define deflection of the upstanding frame toward both sides of the dual-rockers about 40 degrees from the upper and the lower fore eccentric slide-cantilevers behind, thus not only expanding the leeway of each blade from normally 180 degrees up to 260 degrees, but also letting the blade have full load of favorable wind force twice each rotation about the vertical axle.

Referring to the equipoises of this invention, each of which against the inclined blade can adjust its moment of force automatically to keep either neutral or semi-neutral equilibrium between the equipoise and the blade up to 50 degrees while providing appropriate elasticity for the remaining side-ranges within the preset oscillating quadrant by the rolling ball in the reverse-arch tube on the crank counter-lever or by a counter-arm at a counter-lever. In case that the rolling ball in the reverse-arch tube is applied as an equipoise, the blade should be set oscillating within the lower quadrant and be hinged slightly inclined with its inner side a litter higher than its outer side. In case that the counter-arm is applied as an equipoise, the blade may be set oscillating either within the lower quadrant if it is hinged slightly inclined with its inner side a litter higher than its outer side or within the upper quadrant if it is hinged slightly inclined with its inner side a litter lower than its outer side.

Referring to the fore eccentric compressible and tensible slide-cantilevers of this invention, each of which can convert centripetal and circumferential component forces from the blades to the same direction of torque, and each rear eccentric rope strung with a tension spring and connected to the fore eccentric slide-cantiliver can convert centrifugal component force from the blades to the same direction of torque through the fore eccentric slide-cantilever. On the other hand, both the fore eccentric compressible and tensible slide-cantilevers and the rear eccentric tensible ropes can act as shock buffers against gusts and variable wind speed to stabilize the rotary speed of the wheel since the compression springs can absorb centriputal shocks from gusts or variable wind force upon the fore eccentric compressible slide-cantilevers. In addition, the cantilevers can also slide outward to extend their radius for reducing their rotary speed when the centrifugal wind force upon the slide-cantilevers strengthens.

Referring to the upper and lower wheels of this invention, both of which can absorb the circumferential shocks from the gusts and variable wind speed upon the slide-cantilevers like flywheels to stabilize the rotary speed, and the lower wheel can also act as an accelerator and a driving wheel to convert the torque from the fore eccentric slide-cantilevers and the rear eccentric tensible ropes to mechanical power most efficiently for commitment.

Referring to the driven wheels underneath the lower wheel, they are not only able to input mechanical power from the lower wheel, but also able to act as auxiliary supporting rollers to share the load with the main axle. Accordingly, they will enlarge the expensibility of the apparatus in both radial and axial dimensions.

Corresponding and like parts are referred to in the following description and indicated in several views of the accompanying drawings by the same reference-characters:

Vertical axle 1 is mounted on a framework without (or with) bearings as preferred to support the upper and lower wheels 2, 2'.

Figure 1:
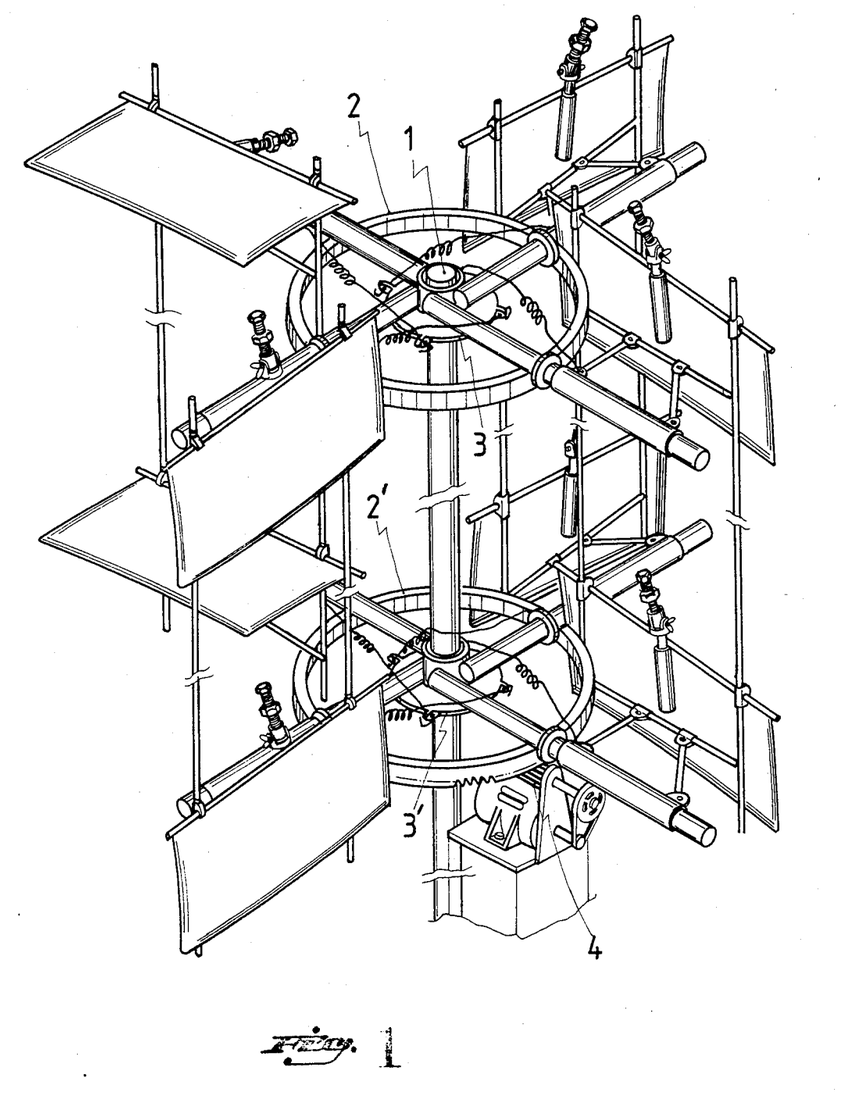
FIG. 1 is a oblique view of a wind turbine with the objects of this invention.
Figure 3:
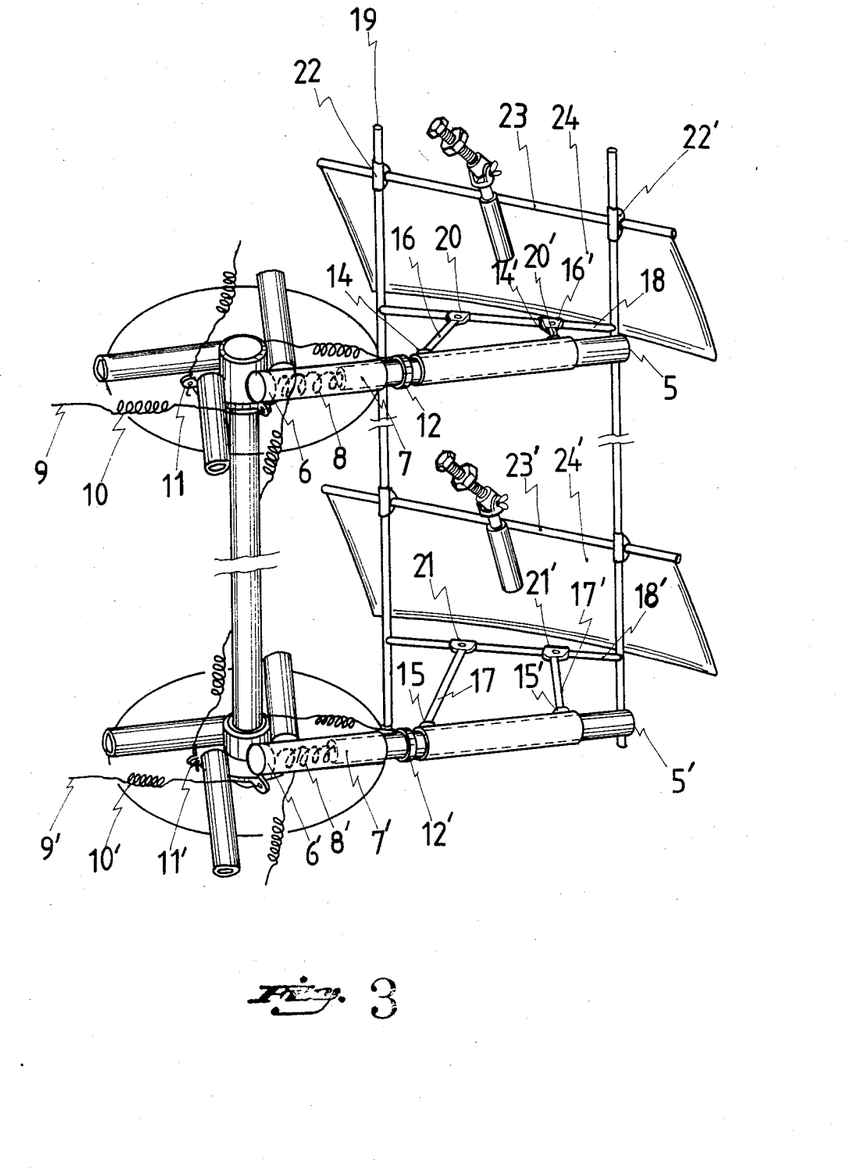
FIG. 3 is a detailed view of a blade mechanism with a pair of dual-rocker trapezoid linnkages chained between the upper and lower fore eccentric slide-cantilevers and the upper and lower beams of an upstanding frame.
Figure 4:
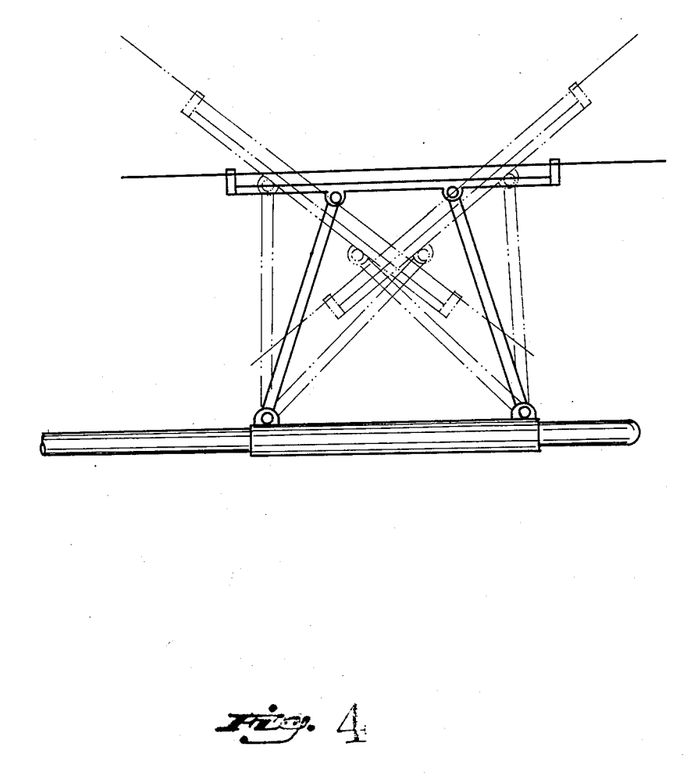
FIG. 4 is a view of a dual-rocker trapezoid linkage deflecting toward either side of the dual-rockers about 40 degrees from the upper and lower fore eccentric slide-cantilevers.

Upper and lower wheels 2, 2' are mounted horizontally on axle 1 with (or without) bearings 3, 3' to support the whole apparatus as shown in FIG. 1 and FIG. 3.

The pairs of upper and lower fore eccentric tube spokes 5, 5' are mounted about axle 1 to hold slide-cantilevers 7, 7' which are inserted into tube spokes 5, 5' and are paded by compression springs 8, 8' at fore eccentric blocks 6, 6' to serve as shock buffers against the centripetal force. The pairs of rear eccentric ropes 9, 9' are strung with tension springs 10, 10' and are connected between rear eccentric stakes 11, 11' and hooks 12, 12' on the slide-cantilevers to serve as shock buffers against the centrifugal force.

The pairs of dual-rocker trapezoid linkages are mounted horizontally between upper and lower slide-cantilevers 7, 7' and upper and lower beams 18, 18' of upstanding frame 19 to define deflection of upstanding frame 19 toward both sides of dual-rockers about 40 degrees from upper and lower slidecantilevers 7, 7'.

Flap-blades 24, 24' each is hinged slightly inclined with its inner side a little higher than outer side or with its outer side a little higher than inner side across upstanding frame 19 at axes 23, 23' on the upper edge of blade 24, 24'. Axis 23 is inserted through bearings 22, 22' on upstanding frame 19. When blade 24 leans against upstanding frame 19, it can catch favorable wind force from the front. When headwind current blows from the back, it will stretch substantially horizontally to release the resistance from the relative wind force. While blade 24 is stretching horizontally to release headwind force, it can also sense incoming upwind from its outer side by its inclined plane and be lifted if its inner side is a little lower than outer side, or be depressed if its inner side is a little higher than outer side. Accordingly, the blade is provided with the capacity for not only loading favorable wind force and releasing headwind resistance, but also detecting and responding to the incoming favorable wind force instantly at the moment of alternation from headwind to favorable wind so as to load favorable wind force timely without waiting until the blade moves deeper into its favorable wind range or returns further toward the center of its oscillating quadrant. The merit of the inclined blade is that it can start loading favorable wind force as soon as it reaches the fore boundary of favorable wind range to achieve higher efficiency than it is hinged horizontally across the upstanding frame.

Figure 5A:
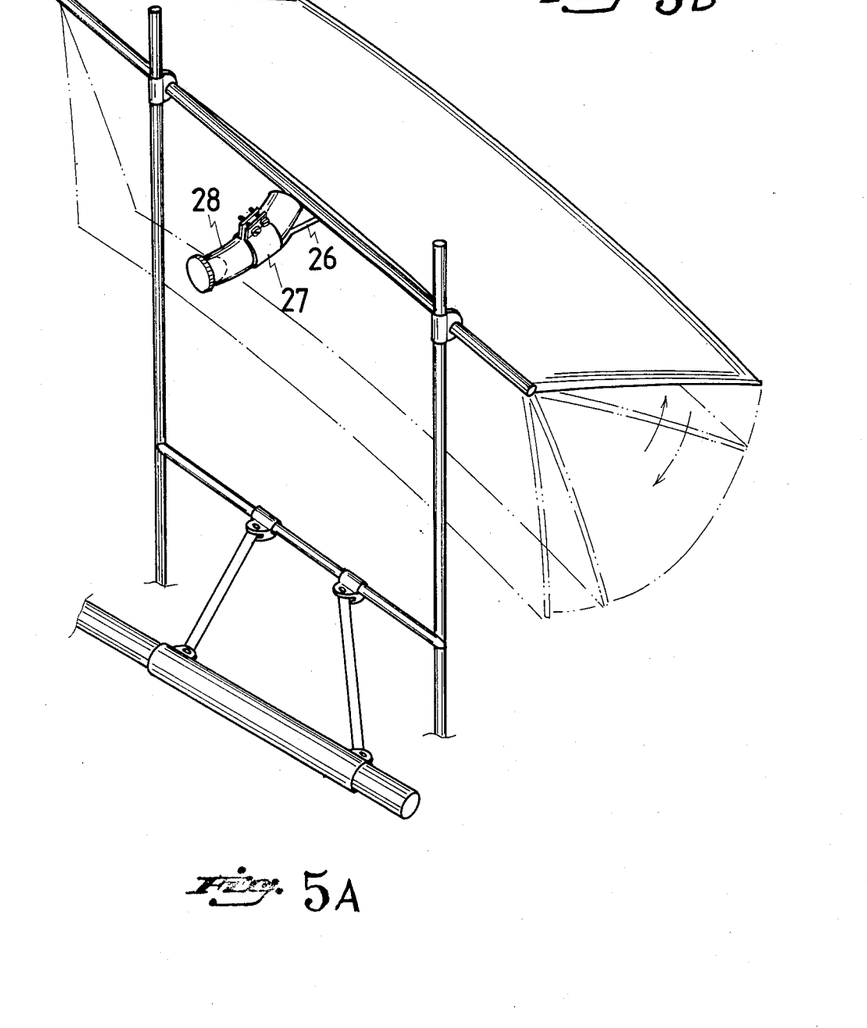
FIGS. 5A and 5B are the detailed views of a sample equipoise with a rolling ball in the reverse-arch tube, which is fastened on a crank counter-lever against the upper edge of a slightly inclined flap-blade with its inner side a little higher than its outer side across the upstanding frame.
Figure 5B:
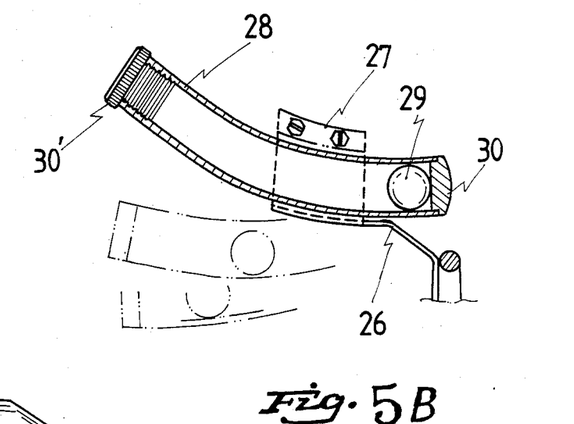

Referring to an equipoise against the upper edge of blade 24 as shown in FIG. 5, in which a crank counter-lever 26 is inserted into tube rib 25 and extends reversely from the upper edge of blade 24. A reverse-arch tube 28 is fastened to crank counter-lever 26 by tube clip 27. A rolling ball 29 acting as an equipoise is sealed within reverse-arch tube 28 by tube covers 30, 30′ to let ball 29 rolling smoothly within reverse-arch tube 28 without dropping off. In this case, axis 23 on the upper edge of blade 24 is hinged slightly inclined with its inner side a little higher than outer side, blade 24 should be set oscillating within the lower quadrant and the zone of its neutral or semi-neutral equilibrium be set between 30 and 60 degrees while leaving the remaining side-ranges in the lower quadrant with minor elasticity.

Figure 6:
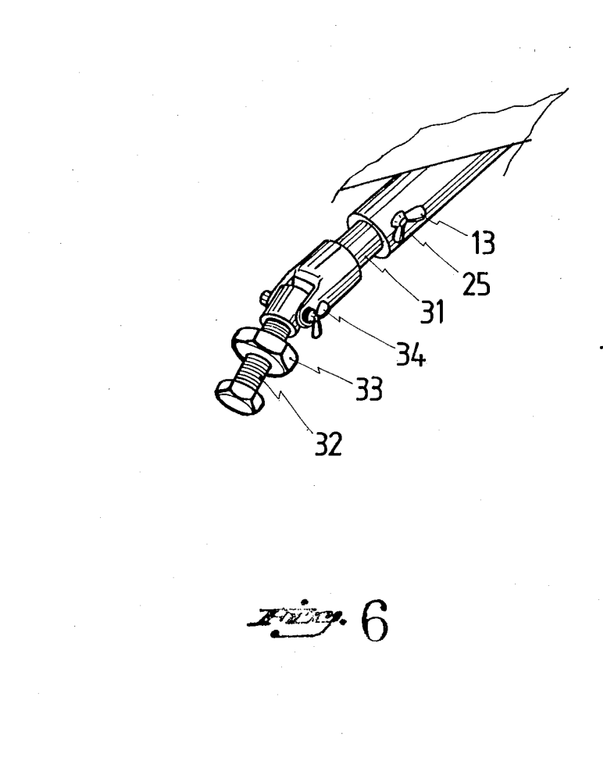
FIGS. 6, 6A and 6B are detailed views of an alternative sample equipoise with a counter-lever and a counter-arm against a slightly inclined flap-blade with its inner side a little lower than its outer side across the upstanding frame.
Figure 6A:
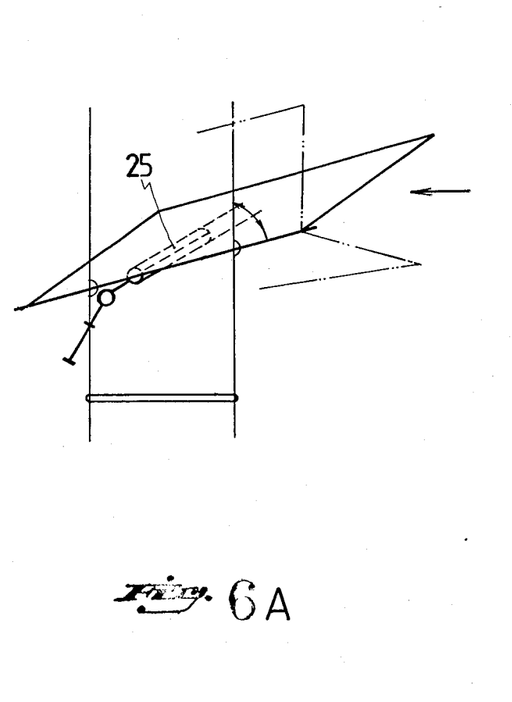
Figure 6B:
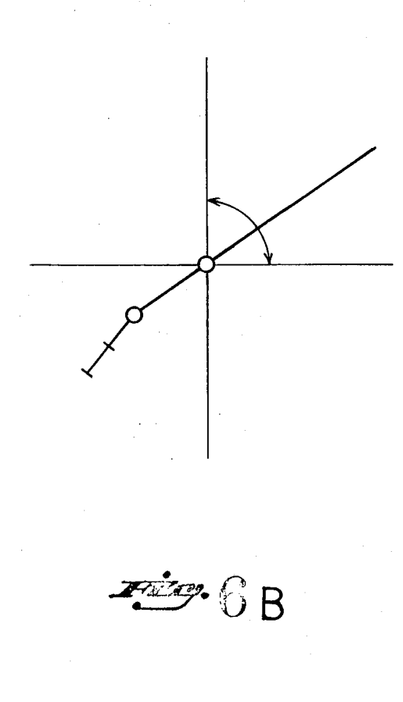
Figure 7:
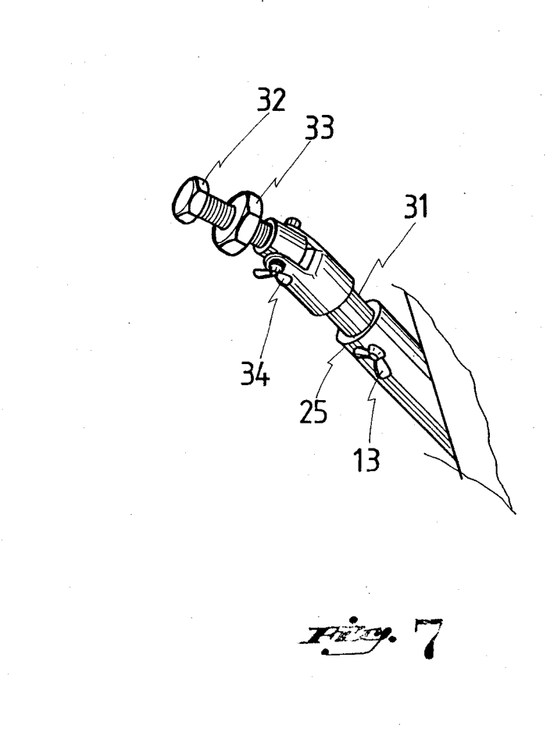
FIGS. 7, 7A and 7B are detailed views of the same sample alternative equipoise with the same counter-lever and counter-arm against a slightly inclined flap-blade but with its inner side a little higher than its outer side across the upstanding frame.
Figure 7A:
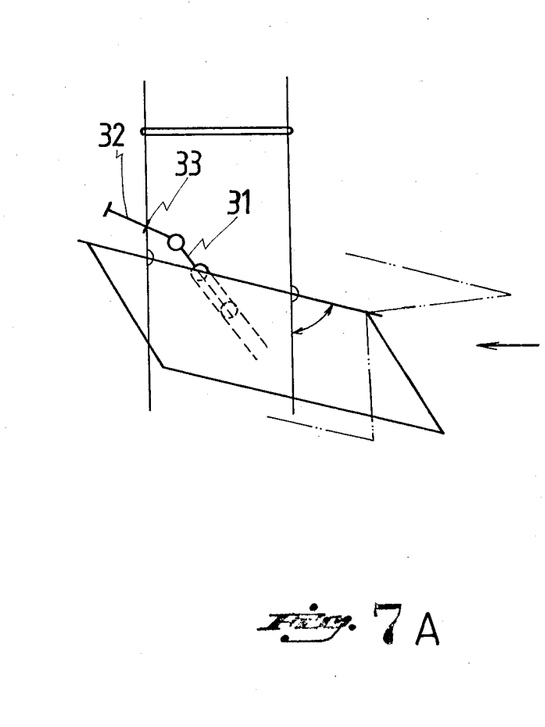
Figure 7B:
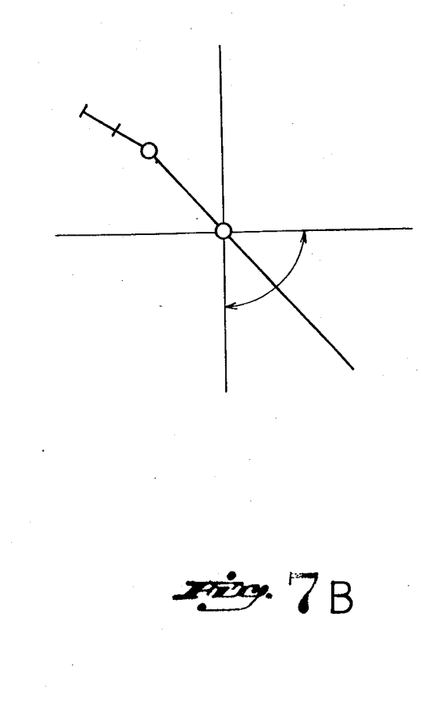

There is an alternative equipoise as shown in FIG. 6A-1, in which counter-lever 31 is inserted into tube rib 25 and extends reversely from the upper edge of blade 24. Counter-arm 32 is linked to the extremity of counter-lever 31 by screw 34. Screw 34 can adjust the contained angle between counter-lever 31 and counter-arm 32 for getting appropriate moment of force. Auxiliary equipoise 33 may be strung onto counter-arm 32 and be finely adjusted along counter-arm 32 to get appropriate counter-weight and to locate appropriate center of gravity. In case that axis 23 of blade 24 is hinged with its inner side a little higher than outer side as shown in FIG. 6B's, blade 24 is preferably set oscillating within the lower quadrant and the zone of its semi-neutral equilibrium is set between 30 and 60 degrees while leaving the remaining side-ranges in the lower quadrant with minor elasticity. In case that axis 23 of blade 24 is hinged with its inner side a little lower than outer side as shown in FIG. 6A's, blade 24 is preferably set oscillating within the upper quadrant and the zone of its semi-neutral equilibrium is set between 105 and 155 degrees while leaving the remaining side-ranges in the upper quadrant with minor elasticity.

For better understanding of the merits and advantages of this invention, detailed description of FIG. 5 is given below:

When blade 24 is set equilibrium at about 30 degrees within the lower quadrant, its reverse-arch tube 28 is uplifting and rolling ball 29 stops at root cover 30. When blade 24 is lifted therefrom, reverse-arch tube 28 starts descending and ball 29 starts rolling down toward the tail of tube 28. Whe blade 24 is lifted to about 60 degrees, ball 29 is stopped by extreme cover 30′ and still maintains equilibrium against blade 24. Reversely, when blade 24 is pulled down from about 60 degrees, tube 28 starts uplifting and ball 29 starts rolling down toward the root of tube 28. When blade 24 descends to about 30 degrees, ball 29 is stopped by root cover 30 and still maintains equilibrium against blade 24. As so, blade 24 is able to oscillate between 30 and 60 degrees within the lower quadrant very lightly and sensitively, while maintaining slight elasticity in the remaining side-ranges for leaping over the maximum headwind resistance within the range from 0 to 30 degrees. In this case, blade 24 is hinged slightly inclined with its inner side a little higher than outer side to let its inclined plane detect and respond instantly to incoming favorable wind from outer side when it lifts horizontally to release relative wind force at the alternate boundary from headwind range toward favorable wind range.

For better understanding of the merits and advantges of this invention, detailed description of FIG. 6B's is given below:

When blade 24 is set equilibrium at 30 degrees within the lower quadrant, its counter-lever 31 is uplifting at 210 degrees counterclockwise with its counter-arm at about 210 to 225 degrees. When blade 24 is lifted up or depressed down between 30 and 60 degrees, counter-lever 31 and counter-arm 32 can maintain neutral or semi-neutral equilibrium with blade 24 to let blade 24 oscillate more sensitively and lightly while maintaining slight elasticity in the remaining side-ranges for leaping over the maximum headwind resistance within the range from 0 to 30 degrees. In this case, blade 24 is hinged slightly inclined with its inner side a little higher than outer side to let its inclined plane detect and respond instantly to incoming favorable wind from outer side when it lifts horizontally to release relative wind force at the alternate boundary from headwind range toward favorable wind range.

For better understanding of the merits and advantages of this invention, detailed description of FIG. 6A's is given below:

When blade 24 is set equilibrium at 130 degrees within the upper quadrant, its counter-lever 31 is at 310 degrees counterclockwise with its counter-arm 32 at about 310 to 325 degrees. When blade 24 is lifted up or depressed down between 105 and 155 degrees, counter-lever 31 and counter-arm 32 can maintain neutral or semi-neutral equilibrium with blade 24 to let blade 24 oscillate more sensitively and lightly while maintaining slight elasticity in the remaining side-ranges for leaping over the maximum headwind resistance within the range from 155 to 180 degrees. In this case, blade 24 is hinged inclined with its outer side a little higher than inner side to let its inclined plane detect and respond instantly to incoming favorable wind from outer side when it stretches horizontally to release relative wind force at the alternate boundary from headwind range toward favorable wind range.

The effect of maintaining blade 24 at neutral or semineutral equilibrium as illustrated for FIG. 6A's & 6B's is achieved by fine adjustment of the length of counter-lever 31, the weight of counter-arm 32, the site of auxiliary equipoise 33 on counter-arm 32, and/or the contained angle between counter-lever 31 and counter-arm 32.

Figure 2:
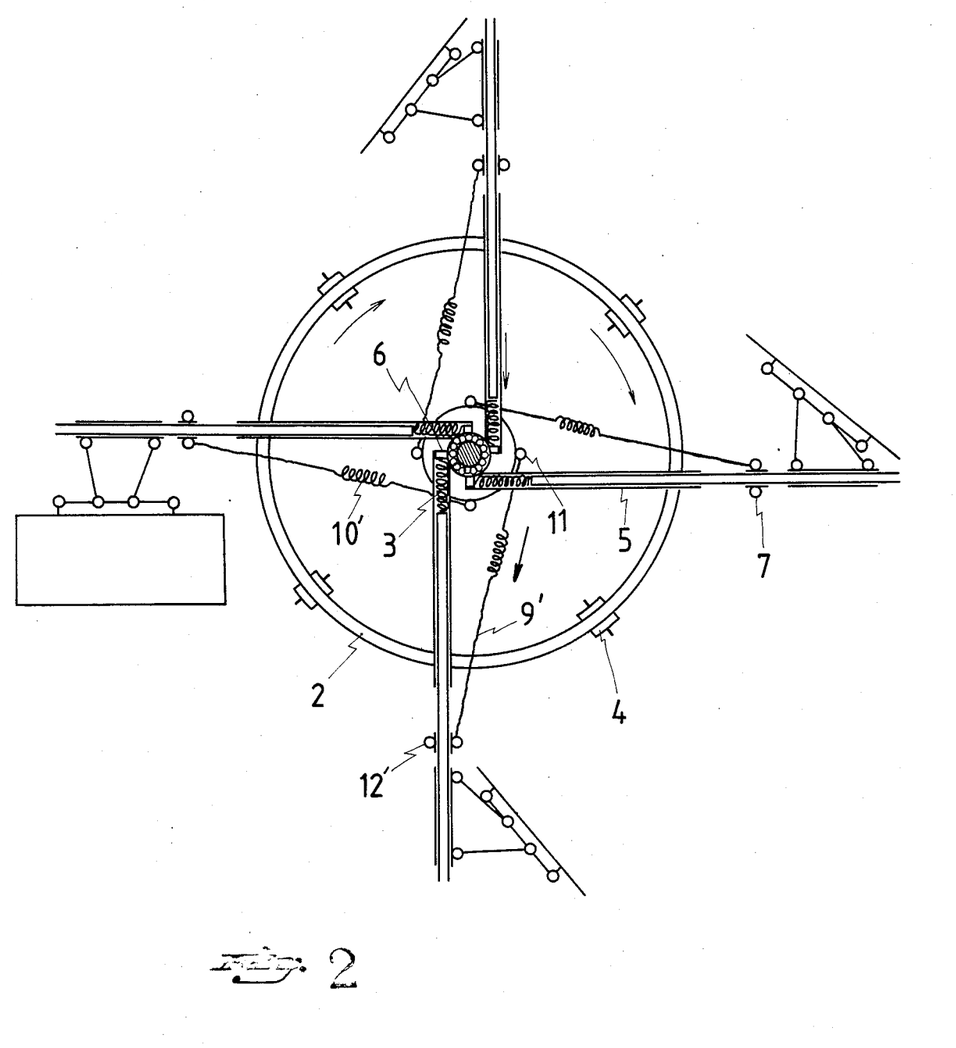
FIG. 2 is a top plane view showing relative positions of the mechanisms when the wind turbine is in operation as the means for converting wind force to rotary motion. The direction of the wind is indicated by the arrow and that of the rotary motion is set clockwise.

For better understanding of the merits and advantages of this invention, detailed description of FIG. 2 is given below with the direction of wind current being indicated by arrows, the direction of the rotary motion being set clockwise, and its positions being illustrated by minutes:

Taking the blade, hinged with its inner side a little lower than outer side and oscillating within the upper quadrant, as an example, when the blade is moving at the upleft position about 53rd minute, the upstanding frame is leaning upon the inner rocker as compelled by the relative wind force, and the axis of the blade is approximately parallel with the direction of relative wind and points it outer end toward the upwind. Here the blade is located at the alternate boundary from the headwind range toward the favorable wind range and stretches substantially horizontally or streamlined as pressed by the relative wind in order to release the resistance from the selective wind force. But since the blade is slightly inclined with its outer side a little higher than inner side as shown in FIG. 6A's, its inclined plane can sensitively detect the incoming favorable wind force from its outer side and can be sensitively and instantly lifted up by the pressure of incoming favorable wind force and the help with its equipoise until it is stopped by the upstanding frame behind. At this moment, the blade starts loading favorable wind force. When the blade moves to 60th minute, its leeway broadens up to about 40 degrees. While defecting toward inner rockers to load favorable wind, the blade produces both centripetal and circumferential compotent forces, which are then converted to the same direction of torque by the upper and lower fore eccentric slide-cantilevers to drive the upper and lower wheels and in the meanwhile the shocks caused by gusts and variable wind speed upon the slide-cantilevers can also be absorbed by compression springs at the fore eccentric blocks. When the blade moves to about 8th minute, its leeway broadens up to about 90 degrees to full load and begins narrowing its leeway with its inner side turning toward the upwind. Here the circumferential component force from the blade can be directly converted to the same direction of torque and in the meanwhile the shocks from the gusts and variable wind speed can also be stabilized by upper and lower wheels. When the blade moves to about 18th minute, its leeway narrows down to about 30 degrees. Here the blade will be flung outward by the centrifugal upwind and the rotary centrifugal force until its frame deflects against its outer rocker. Then the blade restores its leeway up to about 70 degrees till 90 degrees in full load of wind force at about 21st minute. Thereafter the blade narrows its leeway again. When the blade moves to 30th minute, its leeway narrows down to about 40 degrees. While deflecting toward outer rockers to load favorable wind, the blade produces both centrifugal and circumferential component forces, which are then converted to the same direction of torque by the rear eccentric tensible ropes through the fore eccentric slide-cantilevers to drive the upper and lower wheels. Meanwhile the shocks caused by gusts and variable wind speed upon the fore eccentric slide-cantilevers can be absorbed by tension springs strung between the rear eccentric ropes, and the fore eccentric slide-cantilevers can properly adjust its radius to stabilize the rotary speed against the variable wind speed. When the blade moves to about 36th minute, its axis becomes substantially parallel with headwind and points its inner end toward upwind. Here the blade terminates its favorable wind range at the alternate boundary from favorable wind range to headwind range and can no longer move forward itself, but be driven forward by subsequent blades. At this moment, the blade promptly stretches horizontally as pressed by both the elasticity from its equipoise and the relative wind force. When the blade moves through the remaining range of headwind, it keeps substantially streamlined against relative wind force with least resistance and in the meanwhile gradually returns its deflection inward by the help with the relative wind force till its return to about 53rd minute to terminate its first rotation at the alternate boundary from the headwind range to the favorable wind range. Hereafter it restarts its subsequent rotations. Accordingly, the blades drive the wheel one after another to produce the same direction of torque, which is then converted to mechanical power by driven wheels 4, 4' under lower wheel 3' for commitment.

The merits of this invention as noted above then surpasses those of any known apparatus of this kind. While preferred specific embodiments of the invention are hereinbefore set forth, they are described solely by way of example and the improvement is susceptible of various changes of construction without departing from the principle or sacrificing any of the advantages thereof.

I claim:

1. An apparatus relating to a vertical-axle wind turbine comprises upper and lower horizontally disposed wheels, fore eccentric tube spokes, compressible and tensible slide-cantilevers, rear eccentric tension ropes, pairs of dual-rocker trapezoid linkages, inclined flap-blades, and equipoises, in which: The slide-cantilevers each is inserted into respective fore eccentric tube spokes on the upper and lower wheels with a compression spring placed between the fore eccentric block and the inner end of the slide-cantilever, the rear eccentric tension ropes each is connected between the rear eccentric stake and the slide-cantilever, the pairs of dual-rockers trapezoid linkages each are hinged between the upper and lower slide-cantilevers and the upper and lower beams of an upstanding frame to define deflection of the upstanding frame toward both sides of the dual-rockers up to 40 degrees, the declined flap-blades each with its axis on its upper edge hinged slightly inclined across the upstanding frame, and the equipoises each containing a rolling ball in a reverse-arch tube on a crank counter-lever or containing a counter-lever and a counter-arm extends reversely from the upper edge of the flap-blade and the contained angle between counter-lever and counter-arm is adjustable.

* * * * *